United States Patent
Schulz

(10) Patent No.: US 7,350,048 B1
(45) Date of Patent: Mar. 25, 2008

(54) MEMORY SYSTEM TOPOLOGY

(75) Inventor: Jurgen M. Schulz, Pleasanton, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 404 days.

(21) Appl. No.: 10/975,650

(22) Filed: Oct. 28, 2004

(51) Int. Cl.
*G06F 12/00* (2006.01)

(52) U.S. Cl. ...................... 711/170; 711/100

(58) Field of Classification Search ............... 711/115, 711/148, 169, 170
See application file for complete search history.

(56) References Cited

U.S. PATENT DOCUMENTS

| | | | |
|---|---|---|---|
| 6,502,161 B1 | 12/2002 | Perego et al. | |
| 6,725,314 B1 | 4/2004 | Dong | |
| 6,820,181 B2* | 11/2004 | Jeddeloh et al. | 711/169 |
| 6,882,082 B2 | 4/2005 | Greeff et al. | |
| 7,146,480 B2* | 12/2006 | Schlansker et al. | 711/170 |
| 2003/0061447 A1 | 3/2003 | Perego | |
| 2004/0243769 A1* | 12/2004 | Frame et al. | 711/148 |

* cited by examiner

*Primary Examiner*—Pierre Michel Bataille
*Assistant Examiner*—Paul Schlie
(74) *Attorney, Agent, or Firm*—Meyertons Hood Kivlin Kowert & Goetzel, P.C.; Rory D. Rankin

(57) ABSTRACT

A memory system comprising router nodes. A plurality of router nodes are configured to route data between a memory controller and memory modules. The topology of the system comprises a hierarchy of one or more levels. Each of the levels includes one or more router nodes which may be configured to forward received data to another router node at the same level, or forward received data to a next lower level in the hierarchy. Router nodes in the system are configured to correspond to a particular level and position within the hierarchy. The memory controller generates a broadcast transaction to router nodes in the system. In response to receiving the transaction, the router nodes configure their internal routing mechanisms. Subsequently, the controller generates a memory access which is then routed by the router nodes to the target memory modules. Routing is such that memory modules not targeted by the memory access do not see the memory access.

18 Claims, 7 Drawing Sheets

MEMORY SYSTEM TOPOLOGY

BACKGROUND OF THE INVENTION

1. Field of the Invention

This invention relates to memory subsystems and, more particularly, to the topology of a memory system architecture.

2. Description of the Related Art

Over the years, demands placed upon computing systems have increased. As demands increase and technology has advanced, efforts have been made to both increase the capacity of memory systems and reduce memory system latencies. In recent years, proposals have been made for fully-buffered dual-inline memory modules (FB-DIMMs). Traditionally, DIMMs have been configured to buffer both addresses and commands, but the data interface itself has been unbuffered. For a variety of reasons, including loading considerations, such designs have been unable to provide sufficiently high data rates when multiple DIMMs are placed on the same data channel. As a result, DIMMs that buffer data (i.e., FB-DIMMS), as well as addresses and commands, have been proposed. One such proposal includes a buffer chip on each DIMM and uses high-speed unidirectional point-to-point signaling between the memory controller and between DIMMs.

FIG. 1 (prior art) illustrates one embodiment of such a proposal which is being authored by the Joint Electron Device Engineering Council (JEDEC). Among other things, the proposal concerns FB-DIMMs which offer greater capacity including scalability of up to 192 GB and as many as six channels and eight DIMMs per channel. In the example shown, a system 100 is depicted which includes a processing unit 110, a host 120, and memory modules 130A, 130B, 130C, 130D, 130E, 130F. Each of the memory modules 130 are FB-DIMMs 130 and are configured on a channel 156 from the host 120 (e.g., a memory controller) which is in turn coupled to a processing unit 110. Elements referred to herein with a particular reference number followed by a letter will be collectively referred to by the reference number alone. For example, memory modules 130A-130F may be collectively referred to as memory modules 130. In addition, each of the FB-DIMMs 130A-130F includes an advanced memory buffer (AMB) 140A-140F, respectively. Each AMB 140 on the channel 156 must be uniquely identifiable to be addressable by the system.

A first FB-DIMM 130A is coupled to the host 120 by two separate links (160, 170). The first of these links 160 may be referred to as a "downstream" or "southbound" link, in which the first FB-DIMM 130A receives data and/or commands from host 120. The second of these links 170 may be referred to as an "upstream" or "northbound" link, by which data is conveyed from FB-DIMMs 130 to host 120. The remainder of the FB-DIMMs 130 in the embodiment shown are coupled to each other through a plurality of upstream and downstream links as illustrated. In general, a link may be referred to as an upstream link if information conveyed through the link is flowing towards the host 120, while a link may be referred to as a downstream link if information conveyed through the link is flowing away from host 120. The FB-DIMMs 130 are coupled to each other in what is commonly referred to as a "daisy-chain" arrangement.

Generally speaking, downstream communication takes place by sending fixed-size frames on the downstream links, with each frame being sent to each FB-DIMM 130 in turn. These downstream frames are generally pipelined one after another without any gaps. The content of all downstream frames is conveyed from the host 120. Upstream communication takes place by sending a pipelined sequence of fixed-size frames on the upstream links. The content of upstream frames may be updated by FB-DIMMs 130 as they are forwarded by them. All read and write commands, as well as write data, are sent on the downstream links. All read data is sent on the upstream links.

Scheduling of reads and writes is performed by host/memory controller 120. In order to simplify the scheduling, all read data is returned in the order in which it was requested. Thus, data read from a particular FB-DIMM 130 is placed in the first available upstream frame following the availability of the data, while data read from the first FB-DIMM 130A is delayed until the appropriate upstream frame passes it. Each FB-DIMM 130 knows the required latency from when it receives the downstream read command to when it inserts the corresponding read data into an upstream packet (these latencies must be deterministic; they are proposed to be configured during power-on of the channel, although there are questions about the deterministic nature of this initialization scheme). For example, if the propagation delay from one FB-DIMM to another is D ns and the latency for reading data on an FB-DIMM is R ns, and if there are no delays due to framing alignments, the Nth FB-DIMM from the host 120 would provide its read data R ns after receiving its command and the FB-DIMM nearest to the host would provide its read data R+2*(N−1)*D ns after receiving its command. Therefore, regardless of which FB-DIMM 130 is being read, the corresponding read data would arrive at the memory controller R+2*N*D ns after the command was sent out. Example values of N may typically vary from 1 to 8 or 16 and typical values of D may be in the range of 2 ns.

While the proposed scheme may provide for improvements over prior technologies, the limitation of 8 DIMMs per channel may be seen as undesirable. If additional DIMMS are desired, then additional channels must generally be introduced.

In view of the above, an effective and efficient memory architecture is desired.

SUMMARY OF THE INVENTION

A method and mechanism for increasing the number of memory modules supportable in a memory subsystem are contemplated.

A system is contemplated which comprises a host configured to initiate memory accesses; a plurality of memory modules; and a plurality of router nodes. The router nodes are utilized throughout the system in order to route transaction data between the host and various ones of the memory modules. In one embodiment, interconnections between components in the system comprise northbound links and southbound links.

In one embodiment, the topology of the system comprises a hierarchy including one or more levels. Each of the levels includes one or more router nodes which may be configured to either forward received data to another router node at the same level, or forward received data to a next lower level in the hierarchy. Conveying received data to a next lower level in the hierarchy may comprise conveying the received data directly to one or more memory modules, or to another router node for further routing within the system.

Router nodes in the system are configurable to correspond to a particular level and position within the topology of the system. Prior to initiating a memory access to one of the memory modules, the host is configured to generate a broadcast transaction to router nodes in the system. Router nodes receive the broadcast transaction and configure their internal routing mechanisms based upon information included within the broadcast transaction. Subsequently, the host generates a corresponding memory access which is then routed by the router nodes to the target memory modules. In one embodiment, routing is such that memory modules not targeted by the memory access do not see the memory access. In one embodiment, memory modules within the system comprise fully buffered DIMMs (FB-DIMMs). In an alternative embodiment, memory accesses themselves include routing information which is utilized by nodes to route the memory access. In such an alternative embodiment, a broadcast configuration transaction may not be required.

These and other aspects of the invention will become apparent upon reading the following detailed description and upon reference to the accompanying drawings.

Figure 1:
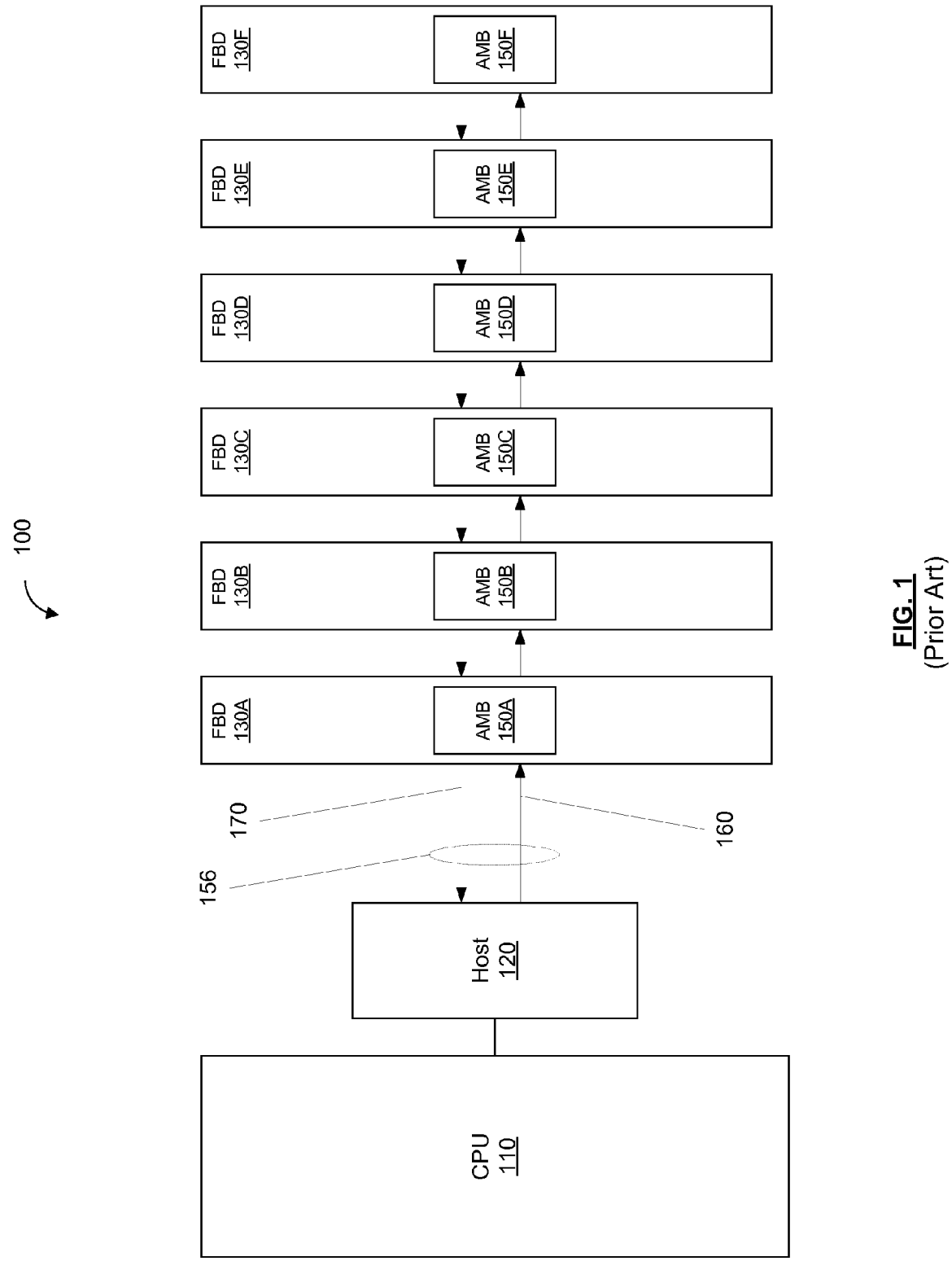
FIG. 1 (Prior Art) is a block diagram of one embodiment of a memory subsystem.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Figure 2:
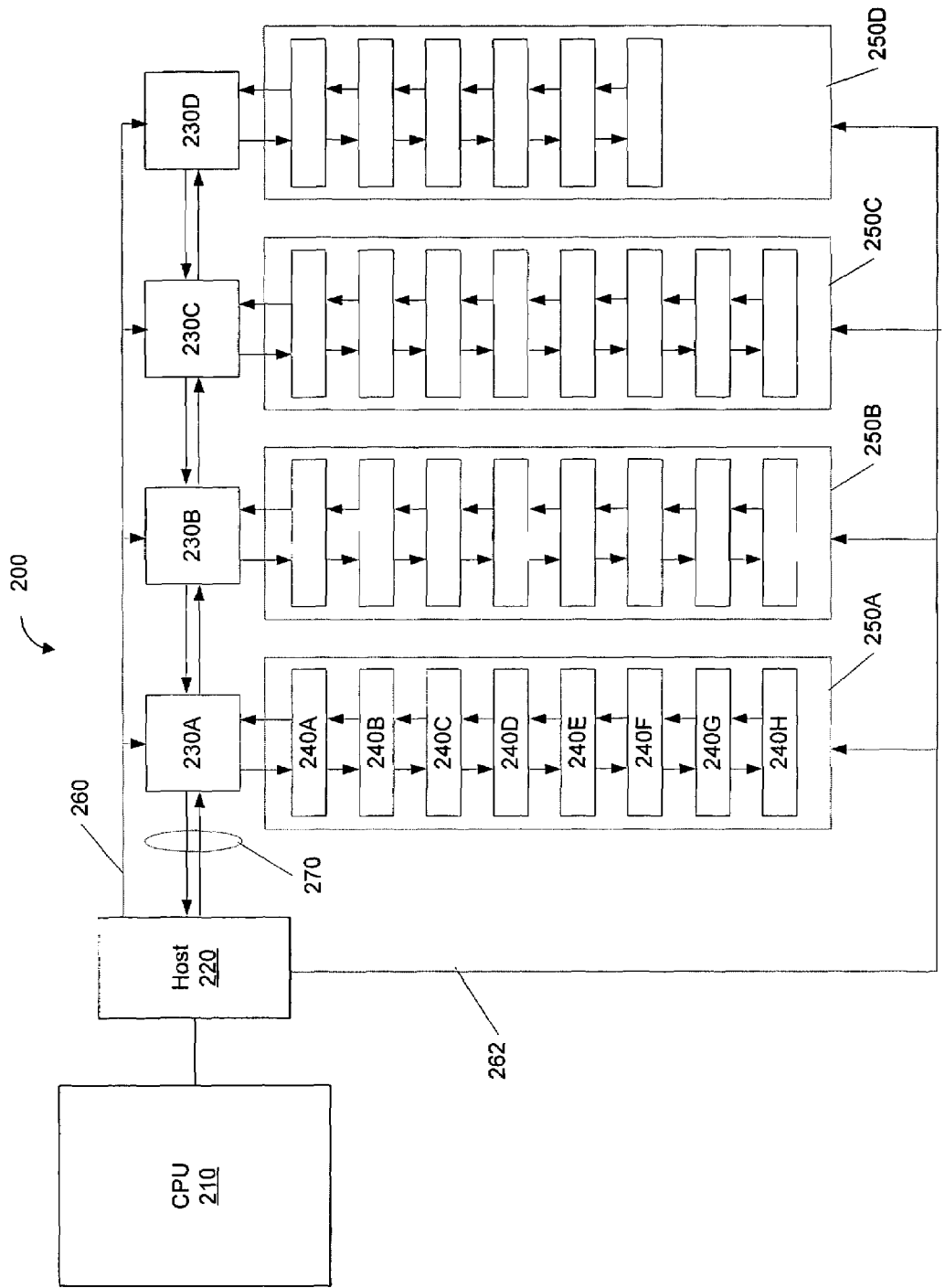
FIG. 2 is a block diagram of one embodiment of a memory subsystem including router nodes.

Turning now to FIG. 2, one embodiment of a memory subsystem is shown. In the example shown, a CPU 210 is coupled to a host 220 which may comprise a memory controller. Host 220 is coupled to a device 230A via links 270. Links 270 may generally correspond to the southbound and northbound links (160, 170) described in FIG. 1. Additional devices 230B-230D are also shown coupled to one another via southbound and northbound links. In addition, host 220 may optionally be coupled to each of the devices 230 via a bus 260 which may be utilized to configure operation of each of the devices 230. Host 220 may also be coupled to one or more of the memory modules (shown enclosed within boxes 250A-250D) via a bus 262 which may be used to configure operation of each memory module. For example, bus 262 may comprises a system management bus. In various embodiments, memory modules may generally be configured to operate as one of 8 DIMMs (DIMM 0-DIMM 7), a repeater, or a logic analyzer interface.

Each of the devices 230 shown in FIG. 2 are coupled to one or more FB-DIMMS. It is noted that embodiments employing other types of memory modules are possible and are contemplated. Device 230A is coupled to FB-DIMMs 250A, device 230B is coupled to FB-DIMMs 250B, device 230C is coupled to FB-DIMMs 250C, and device 230D is coupled to FB-DIMMs 250D. FB-DIMMs 250 are generally configured to operate as described in FIG. 1. For example, FB-DIMMs 240A-240H may include an advanced memory buffer (AMB) as described above and may convey data via southbound and northbound links in a daisy chain fashion as previously described.

Each of devices 230 is generally configured to operate as a router. For example, device 230A may receive data from host 220 via channel 270 and convey the received data to either FB-DIMMs 250A or device 230B depending upon the target of the data. In one embodiment, a memory read/write access initiated by host 220 includes a write configuration transaction which is broadcast to each of the devices 230 in the system 200. The configuration transaction includes information which is used by each of the devices to determine how a corresponding memory access should be directed in order to reach a target memory module.

For example, assume a scenario in which a write is to be performed to one of memory modules 250C. In the system of FIG. 1, a memory access may be directed to a particular memory module which is uniquely identifiable within the system. As discussed above, up to 8 FB-DIMMs may be supported in such a system. However, in the embodiment of FIG. 2, should a memory access directed to one of eight FB-DIMMs be broadcast throughout the system 200, multiple FB-DIMMs may detect the access as being directed to itself. Therefore, in order to avoid such ambiguity, the memory access should only be seen by the memory module to which it is actually directed.

In order to accomplish this, and avoid ambiguity, prior to the actual memory access to the targeted memory module within modules 250C, host 220 generates a write configuration transaction which is broadcast to each of the devices 230. The write configuration transaction includes information which identifies device 230C as corresponding to the memory access. Devices 230A and 230B detect that they do not directly correspond to the memory access. Therefore, device 230A is configured to forward the received memory access to device 230B, and device 230B is configured to forward the received memory access to device 230C. However, rather than forwarding the memory access to device 230D, device 230C is configured to convey the memory access to memory modules 250C. In this manner, the memory access which follows the write configuration transaction is only seen by the memory modules to which it corresponds. The memory access itself within FB-DIMMs 250C may generally operate as described in FIG. 1.

In one embodiment, each of devices 230 are configurable to correspond to a particular position/location within the topology of the system. For example, device 230A is configured at a first position, device 230B at a second position, and so on. Write configuration transactions then include information which is identifiable as corresponding to a particular position/location. For example, in a simple case, a write configuration transaction could include four bits, with each corresponding to one of devices 230A-230D. By setting a particular bit in the transaction, a corresponding device may be configured to route received data in a particular manner (e.g., to an attached memory module(s), or to a next device 230). Numerous other encodings are possible and are contemplated.

In the case of a read access, data which his read from a memory module is conveyed via a corresponding device 230 back to the host 220. For example, a read access to a memory module within modules 250C may return data to device 230C which then conveys the data via northbound links to host 220. In this embodiment, the data is not forwarded to device 230D prior to being conveyed to host 220. Alternative embodiments may include forwarding the data to device 230D so that devices 230 operate as a daisy chain. As may be appreciated from the embodiment of FIG. 2, a single channel 270 may support up to 4×8=32 FB-DIMMs, as opposed to 8 FB-DIMMs in the example of FIG. 1.

Figure 3:
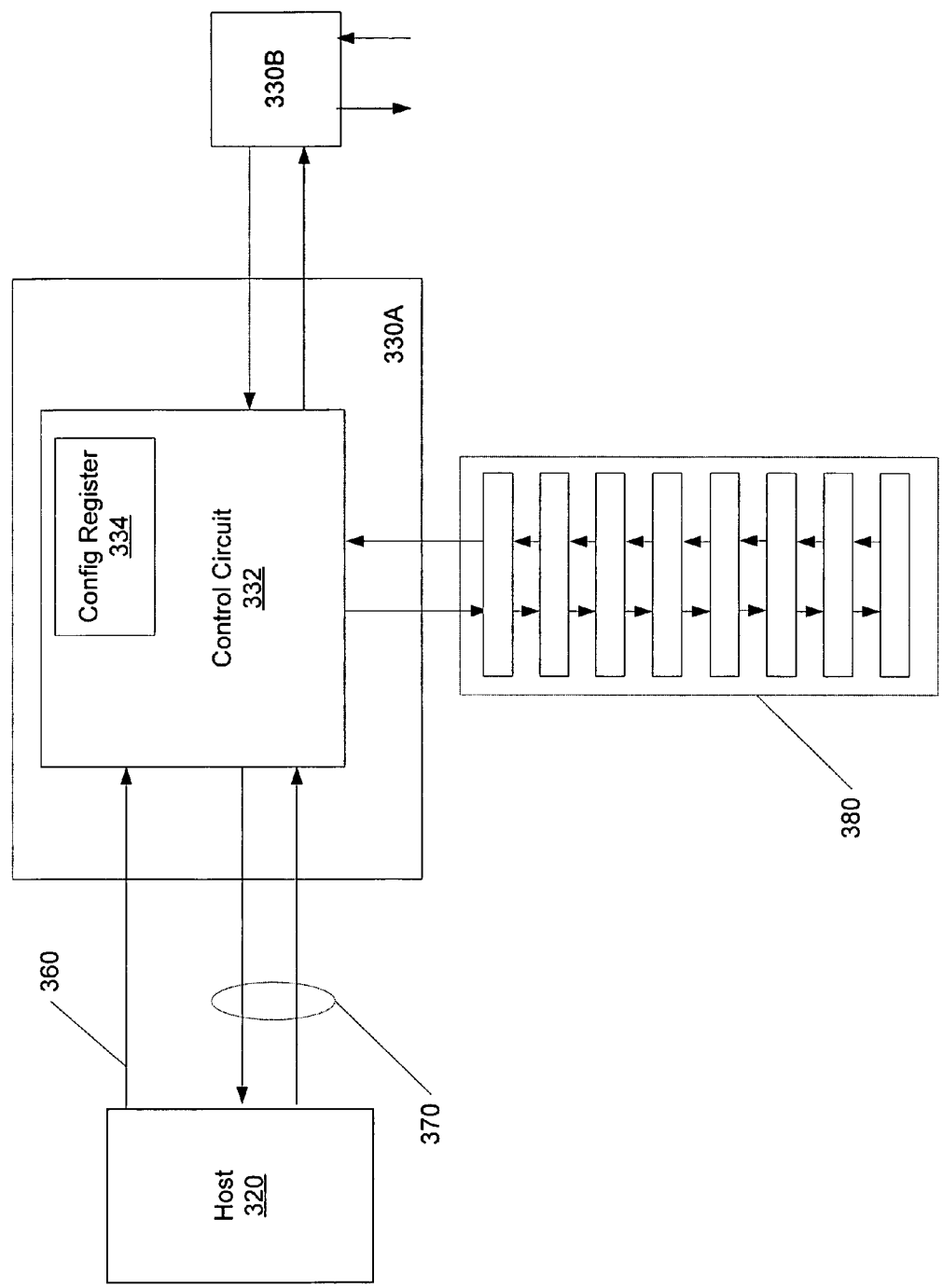
FIG. 3 is a block diagram of one embodiment of a memory subsystem and a router node.

FIG. 3 depicts one embodiment of a portion of system 200. In the example shown, device 230A is shown to include a control circuit 332 and a configuration register(s) 334. While configuration register 334 is shown to be included within control circuit 332, this need not be the case. In one embodiment, bus 260 may be used to initialize devices 230A and 230B at system boot or some other appropriate time. Configuration of a device may also include information identifying a particular level in a hierarchical multi-level system as described further below. As described in FIG. 2, host 220 may precede a memory access with a broadcast write configuration transaction. Each device receives the write configuration transaction which includes information usable to route a following memory access. For example, if host 220 initiates a memory access to one of memory modules 250C, the host 220 precedes the memory access with a write configuration transaction.

In one embodiment, such write configuration transactions may be directed to a special address(es) which is identifiable by various devices within the system as such a write configuration transaction. In response to the write configuration transaction, device 230A enables links 310 and disables links 320 for the corresponding memory access. In this manner, the corresponding memory access is conveyed by device 230A to memory modules 250A and not to device 230B. Subsequent memory accesses by host 220 to the same memory modules 250C may not require a new preceding write configuration transaction. In the event different memory modules are addressed, a new write configuration transaction may be conveyed in order to reconfigure routing of accesses within the system.

Figure 4:
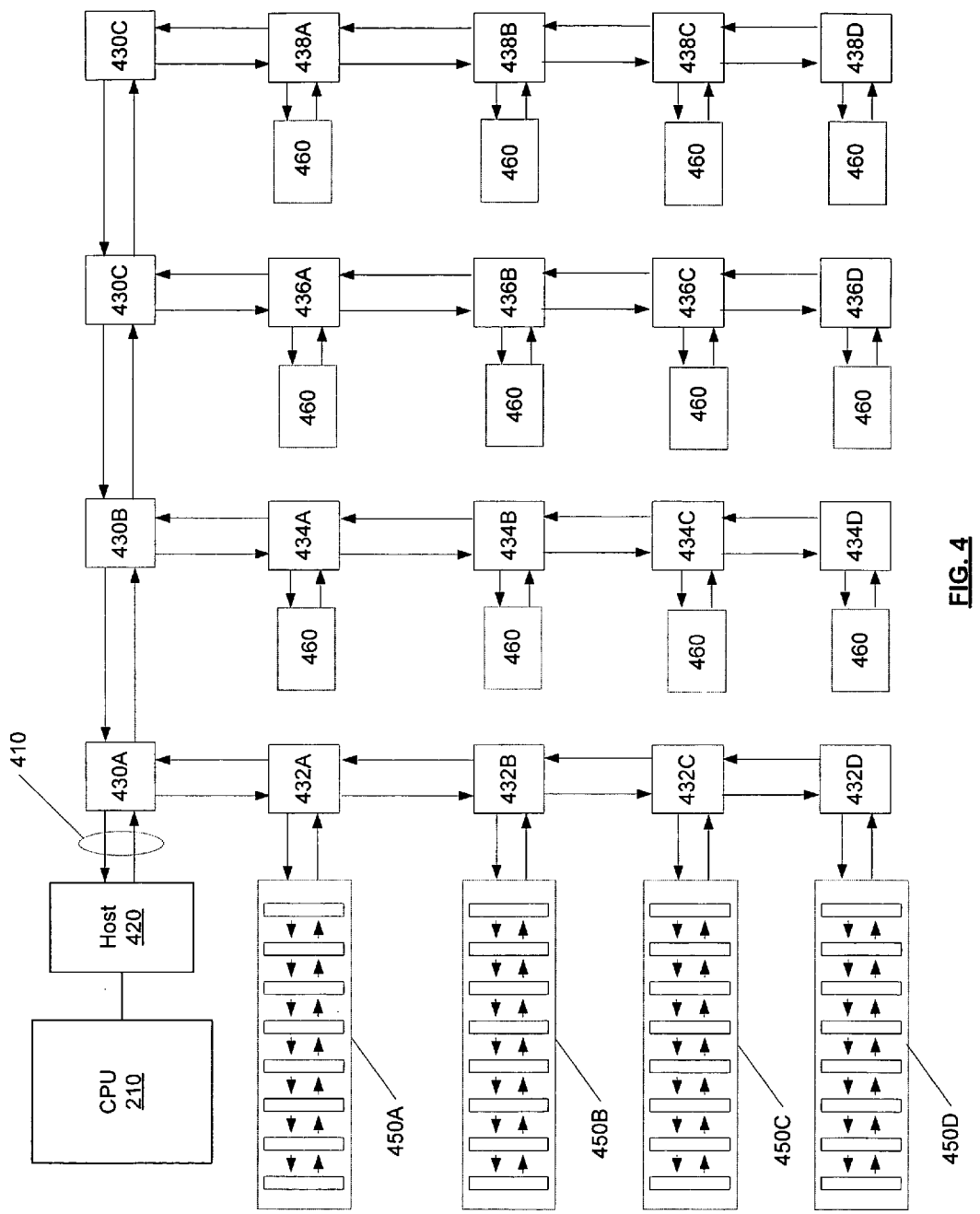
FIG. 4 illustrates one embodiment of a hierarchical memory system.

As mentioned above, devices such as 230A may be configured to operate within a multi-level system. FIG. 4 depicts one embodiment of a two level system. In one embodiment, routing devices such as device 230A may be configured to correspond to a particular location within the system topology. In the embodiment shown, devices 430A-430D (which may also be referred to as "nodes" or "router nodes") correspond to level "one". Branching off of each of the level one nodes are level two nodes. For example, level one node 430A is coupled to level two nodes 432A-432D. In one embodiment, up to four nodes per level may be supported. Alternative embodiments may be configured to support fewer or more than four nodes per level. Each level two node may be coupled to one or more memory modules. For example, nodes 432A-432D are coupled to memory modules 450A-450D, respectively. Likewise, each of nodes 434, 436, and 438 are coupled to memory modules 460.

Each of the nodes in the system of FIG. 4 may be configured to correspond to a particular position and level within the system. For example, nodes 430A and 432 may correspond to position one, nodes 430B and 434 may correspond to position two, nodes 430C and 436 may correspond to position three, and nodes 430D and 438 may correspond to position four. Therefore, node 434B may be identified as the node at level two, position two. In such an embodiment, host 420 may then precede a memory access with a write configuration transaction which appropriately configures the nodes which correspond to the memory modules being addressed. Information included within the write configuration transaction may then include data corresponding to each level within the system. For example, a memory access to modules 450C may be preceded with a configuration transaction which causes node 430A to convey the corresponding data to node 432A, node 432A to convey data to node 432B, and node 432C to convey data to modules 450C. If a single bit were used to correspond to a given node, only eight bits would be required to configure the nodes in system of FIG. 4. Four bits would be used to for each node in level one, and four bits would be used in level two.

Figure 5:
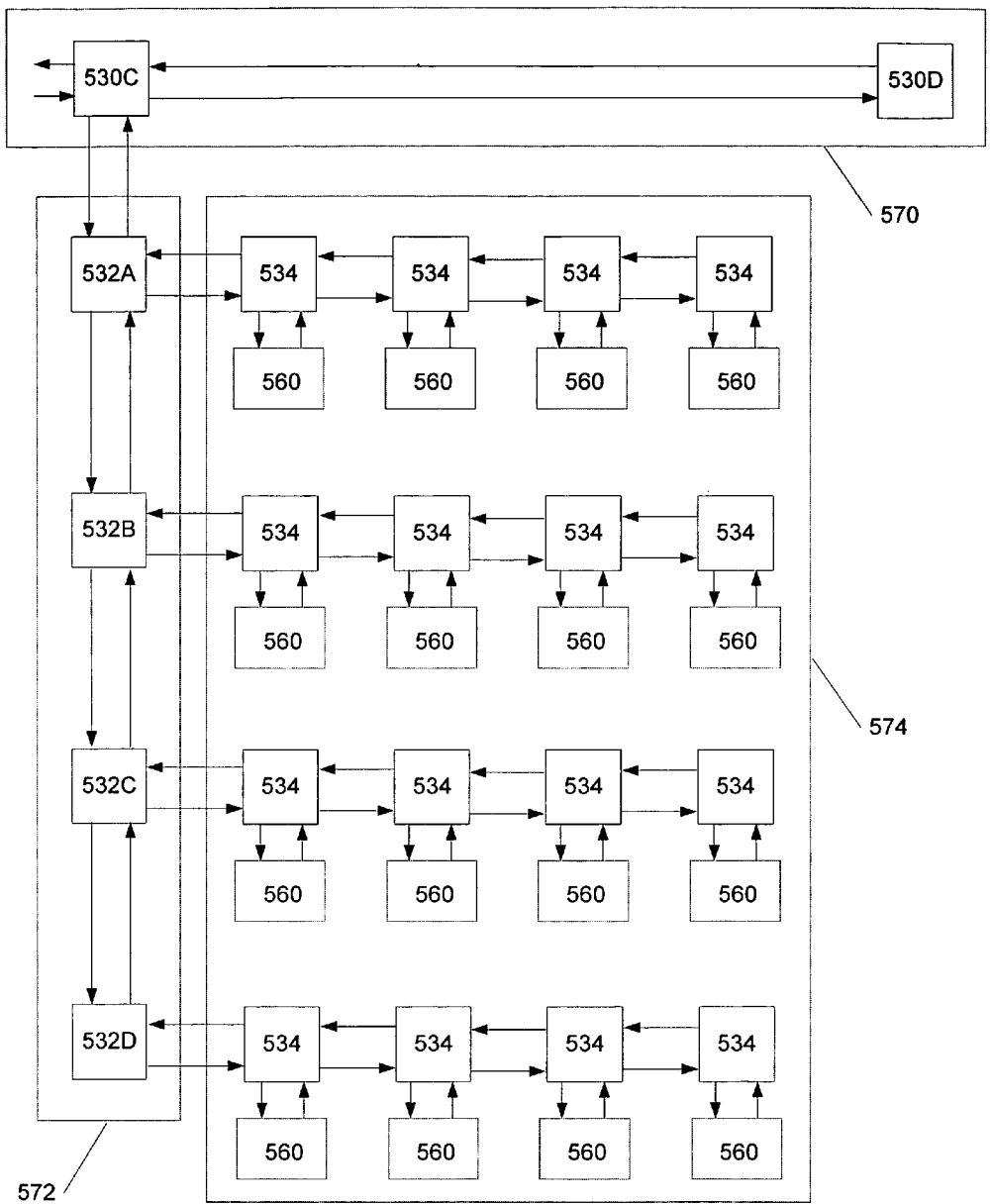
FIG. 5 illustrates one embodiment of a hierarchical memory system.

In one embodiment, write configuration transactions include 32 bits and may support up to 8 levels of router devices per channel. FIG. 5 depicts a three level system illustrating a first level of nodes 570 (530C and 530D), a second level of nodes 572 (nodes 532), and a third level of nodes 574 (nodes 534). In an embodiment which supports up to four nodes per level, each node in the first level may support up to 16 third level nodes. In turn, each third level node in the example shown may support up to 8 FB-DIMMs 560. Consequently, in a three level system a single channel may support up to 4 (level one nodes)×(4 level two nodes)×4 (level three nodes)×8 FB-DIMMs=512 FB-DIMMs. In general, an N level system which supports four nodes per level such as that described may support up to $4^N \times 8$ FB-DIMMs. In an 8 level system, up to $4^8 \times 8 = 524,288$ FB-DIMMs may be supported on a single channel.

Figure 6:
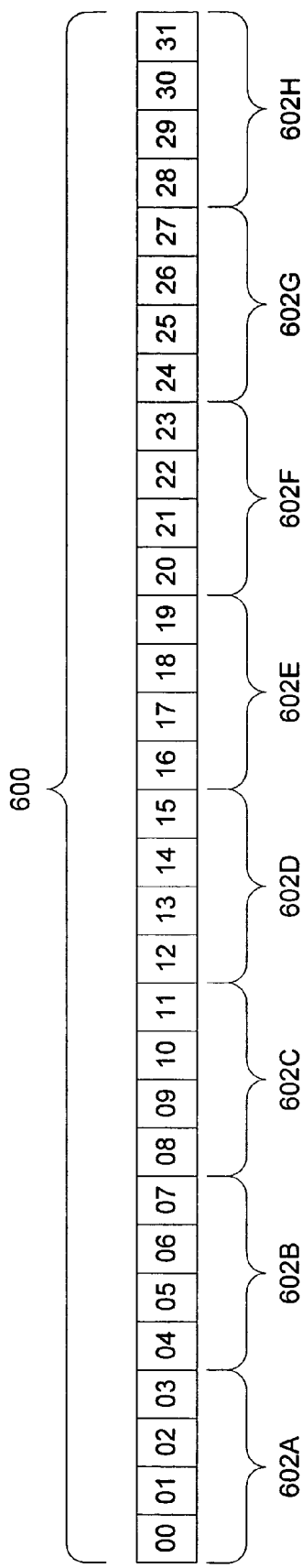
FIG. 6 illustrates one embodiment of the format of write configuration data.

FIG. 6 illustrates one embodiment of a write configuration transaction 600 for an eight level system in which four node may be supported per level. In the embodiment shown, a single bit for each node in a level is provided. The 32 bits of the data 600 are partitioned into 8 groups (602A-602H) of four bits each. In one embodiment, a bit which is set indicates the corresponding node is included in the path to the memory module to be accessed. When the corresponding memory access data is received, a node on the path (i.e., a node in which the configuration transaction had a corresponding set bit) routes the received data to the next lower level (or the memory modules if it is the last level). A node which is not on the indicated path merely forwards the data on to a next node in the same level.

As an example of a write configuration encoding, assume the two level system depicted in FIG. 4. Each level includes four nodes. In the event of a memory access to the memory modules coupled to node 436C, a 32 bit write configuration transaction preceding the memory access may take the following form:

0010 0010 0000 0000 0000 0000 0000 0000

As described above in FIG. 6, the 32 bits are partitioned into groups of four with each corresponding to one of eight levels. The bits corresponding to the first level (the first four bits 0010) indicate that the node in bit position three counting from the left is on the path. Therefore, the first two nodes of level one will be configured to forward the received data and the third node will convey the received data to the next level (i.e., node 436A). The bits corresponding to the second level (the second four bits 0010) also indicate the node in position three is on the path. Therefore, rather than forwarding received data to node 436D, node 436C will be configured to convey the received data to its coupled memory modules.

As already described, nodes are configured to correspond to a particular level and position within the system. Therefore, when receiving a broadcast write configuration transaction, each node is configured to identify the portion(s) of the transaction data which correspond to the particular node. Accordingly, nodes in level one may be configured to examine the first four bits of the data, nodes in level two may examine the second four bits of the data, and so on. Alternatively, each node could be configured to examine the data corresponding to all nodes on its path. If a level does not include an enabled node leading to a particular node, the node may determine it is not being addressed. Of course, those skilled in the art will appreciate that different encodings and than that depicted above may be utilized.

Figure 7:
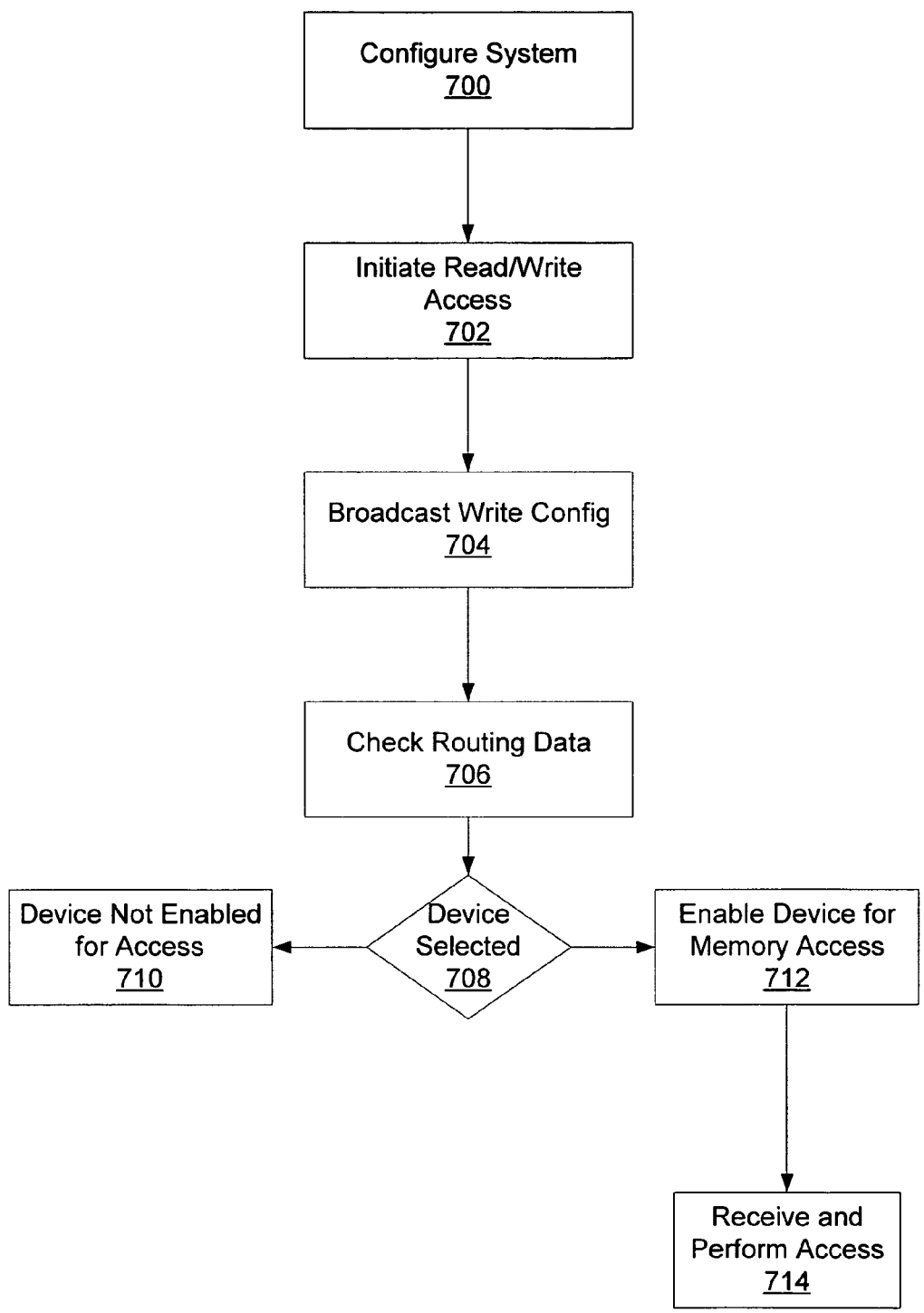
FIG. 7 illustrates one embodiment of a method for configuring router nodes and performing a memory access in a memory system.

Turning now to FIG. 7, one embodiment of a method for performing a memory access in an FB-DIMM memory subsystem is illustrated. Initially, a system is configured (block 700) to operate in accordance with the above described memory subsystem. During initialization, nodes within the system are configured to correspond to a particular level and position/location within the system. When a read/write memory access is initiated (block 702), the destination address/module is determined and a broadcast write configuration transaction is conveyed (block 704) by the host initiating the access. It is noted that if a repeated access to a particular group of memory modules occurs, it may not be necessary to perform the broadcast write transaction. The write configuration transaction includes data corresponding to nodes within the system.

Upon receiving the transaction, each node then checks its corresponding data within the configuration transaction (block 706). If the device is identified as being on the path (block 708), the device is enabled (block 712) for access by configuring it to convey data to the next lower level or to attached memory modules. Subsequently, the node receives the corresponding data and an access may be performed (block 714). Alternatively, if the device is not identified as being on the path (block 708), the device is configured to convey the data to a next node on the same level.

In the above described embodiments, configuration transactions are utilized to convey routing information and enable devices along a path to a target device. Subsequently, a read or write is performed to the target device. However, in alternative embodiments, routing information may be included within the read or write transaction packets themselves. For example, in one embodiment, particular bits of a read or write transaction packet may be reserved for routing information. Receiving nodes may then examine these bits to determine whether the particular device is on the indicated path. If the device is identified as being on the path, the device is enabled for access as described above. In such an embodiment, the preceding broadcast configuration transaction may be eliminated.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A memory subsystem comprising:
a host configured to initiate memory accesses;
a plurality of memory modules; and
a plurality of router nodes;
wherein the host is coupled to a first router node of the plurality of router nodes by a channel comprising a southbound link and a northbound link; and
wherein each of the plurality of router nodes is configured to be coupled to a subsequent one of the plurality of router nodes through a first southbound link and a first northbound link; and wherein each of the plurality of nodes further includes an interface configured to be coupled to one of said memory modules or a router node in a next level of a hierarchy of levels;
wherein said host is configured to initialize each of the plurality of nodes to correspond to a particular level and position within the hierarchy of levels;
wherein subsequent to initializing each of the nodes and during system operation, in performing a memory access to one of said plurality of memory modules, the host is configured to:
determine a destination module of the memory access;
convey a write configuration transaction which configures each of the router nodes to (i) route a corresponding memory access via a first interface to a next router node in a same level; or (ii) route a corresponding memory access via a second interface; and
convey the memory access.

2. The memory subsystem as recited in claim 1, wherein the second interface is coupled to either a router node in a next lower level of the hierarchy or a memory module.

3. The memory subsystem as recited in claim 2, wherein said plurality of memory modules comprise fully buffered DIMMs (FB-DIMMs) configured to be coupled to one another via northbound links and southbound links.

4. The memory subsystem as recited in claim 3, wherein the memory modules are coupled to one another in a daisy chain topology.

5. The memory subsystem as recited in claim 2, wherein the write configuration transaction is a broadcast transaction including a plurality of bits, each of said bits corresponding to a particular level and position within the hierarchy.

6. The memory subsystem as recited in claim 5, wherein each node is configurable to correspond to a particular level and position within said hierarchy, and wherein each node is configured to identify data within the write configuration transaction which corresponds to its level and position.

7. A method comprising:
initializing each of a plurality of router nodes in a system to correspond to a particular level and position within a hierarchy of levels;
conveying a write configuration transaction subsequent to said initializing, wherein the write configuration transaction includes data configured to configure one or more of the router nodes in the system to route data which corresponds to a memory access to a first memory module of a plurality of memory modules of the system;
configuring the router nodes in response to the write configuration transaction;
receiving data corresponding to the memory access;
initiating a memory access to a first memory module of a plurality of memory modules in a system; and routing the data corresponding to the memory access from a first router node to either a next router node in a same level of a hierarchy of levels, or to a next level in a hierarchy of levels.

8. The method as recited in claim 7, wherein the host is coupled to a first router node of the plurality of router nodes by a channel comprising a southbound link and a northbound link, and wherein each of the router nodes is configured to couple to other router nodes or devices via pairs of southbound links and northbound links.

9. The method as recited in claim 8, further comprising the write configuration transaction configuring each of the router nodes to (i) route a corresponding memory access via a first interface to a next router node in a same level; or (ii) route a corresponding memory access via a second interface.

10. The method as recited in claim 9, wherein the second interface is coupled to either a router node in a next lower level of the hierarchy or a memory module.

11. The method as recited in claim 9, wherein said plurality of memory modules comprise fully buffered DIMMs (FB-DIMMs) configured to be coupled to one another via northbound links and southbound links.

12. The method as recited in claim 11, wherein the memory modules are coupled to one another in a daisy chain topology.

13. The method as recited in claim 8, further comprising broadcasting the write configuration transaction as a plurality of bits, each of the bits corresponding to a particular level and position within the hierarchy.

14. The method as recited in claim 13, further comprising configuring each node to correspond to a particular level and position within said hierarchy, and wherein each node is configured to identify data within the write configuration transaction which corresponds to its level and position.

15. A router node for use in a memory subsystem, said router node comprising:
   a first interface including a northbound link and a southbound link;
   a second interface including a northbound link and a southbound link;
   a third interface including a northbound link and a southbound link;
   wherein the first interface is configured to be coupled to either a host controller or another router node in a same level of a hierarchy of levels of a memory system topology;
   wherein the second interface is configured to be coupled to another router node in a same level of hierarchy;
   wherein the third interface is configured to be coupled to a next level in the hierarchy of levels; and
   a control unit, wherein the control unit prior to an initiation of a memory access, and subsequent to initialization, is configured by a write configuration transaction to route memory access data received on the first interface (i) to a next router node in a same level; or (ii) to the next level in the hierarchy of levels.

16. The router node as recited in claim 15, wherein third interface is configured to be coupled to either another router node or a plurality of memory modules.

17. The router node as recited in claim 16, wherein each of the memory modules comprise fully buffered DIMMs (FB-DIMMs) configured to be coupled to one another via northbound links and southbound links.

18. The router node as recited in claim 17, wherein the memory modules are coupled to one another in a daisy chain topology.

* * * * *